Patented Jan. 30, 1923.

1,443,640

UNITED STATES PATENT OFFICE.

FRIEDERICH MÜLLER, OF HARTFORD, CONNECTICUT, AND ERNEST WILDHABER, OF BROOKLYN, NEW YORK, ASSIGNORS TO PRATT & WHITNEY COMPANY, OF NEW YORK, N. Y., A CORPORATION OF NEW JERSEY.

RELIEVING MACHINE.

Application filed May 16, 1921. Serial No. 469,792.

*To all whom it may concern:*

Be it known that we, FRIEDERICH MÜLLER, a citizen of the United States, and a resident of Hartford, in the county of Hartford and State of Connecticut, and ERNEST WILDHABER, a citizen of the Republic of Switzerland, and a resident of Brooklyn, in the county of Kings and State of New York, have invented certain new and useful Improvements in Relieving Machines, of which the following is a specification.

Our invention relates to relieving machines and particularly to relieving machines for operating on cutter blanks having teeth provided with non-radially arranged cutting faces.

One object of our invention is to provide a machine that shall comprise a former and a former pin for so guiding a cutting tool as to cut a blank to a rectilinear or to a non-rectilinear contour while effecting relieving movements of the cutting tool and varying the relation between the former pin and the cutting tool to compensate such relieving movements at different blank diameters for the non-radially arranged cutting faces on the teeth of the blank.

Another object of our invention is to provide a machine of the above indicated character, having a former and a former pin for guiding the cutting tool to cut the blank to a predetermined contour, that shall effect relieving movements of the tool to relieve the teeth of the blank in conformity either to helical or straight teeth while compensating such relieving movements at different blank diameters for the non-radially arranged cutting faces on the teeth of the blank.

A further object of our invention is to provide a machine, having a former and a former pin for guiding the cutting tool to cut the blank to a rectilinear or to a non-rectilinear contour, that shall comprise means for effecting feeding movements between the cutting tool and the blank, means for effecting relieving movements of the cutting tool in conformity either to straight or to helical teeth, and means for varying the relation between the former pin and the cutting tool to compensate at different blank diameters for the non-radial cutting faces on the teeth of the blank.

In the art of cutting many materials and particularly in cutting metals, it is preferable for many classes of work to incline the face of the cutting tool backward with respect to the direction of movement thus providing a rake or undercut which provides a sharper cutting edge and enables other advantages to be obtained. To a very limited extent this principle has been applied to milling cutters, the cutter faces being inclined backward with respect to radial lines, but it has n>t, heretofore, been deemed possible to cut a milling cutter to different diameters in accordance with a predetermined contour and to effect relieving movements so that the teeth can be ground on the cutting faces without changing the effective contour of the blank. If the cutter is cut to more than one diameter and the teeth have faces which are undercut or non-radially arranged, it is essential, while cutting the blank, to compensate the relieving operation at the different blank diameters for the non-radial cutting faces on the teeth.

This application contains some features which are disclosed in the patents of Friederich Müller, No. 1,429,617 dated September 19, 1922, and No. 1,429,611 dated September 19, 1922. The invention disclosed in this application is also disclosed in the application of Friederich Müller Serial No. 469,266 filed May 13, 1921. In the application Serial No. 469,266 means is broadly claimed for compensating the relieving operation at different blank diameters. Moreover, the method disclosed in this application is disclosed and broadly claimed in the application Serial No. 469,266. The machine disclosed in this application is adapted to form a cutter such as is described and claimed in the application of Friederich Müller Serial No. 323,110 filed September 11, 1919.

The cutters, which are shaped by the relieving machine disclosed in this application, are adapted to cut any practical contour. Each cutter blank is cut to different diameters and is adapted to cut either a rectilinear or a non-rectilinear contour. The cutting teeth on the blank are either helical or straight in form and are provided with non-radially arranged cutting faces. In case the teeth are helical in form, the cutting face of each tooth conforms to a helicoid. The helicoid is formed by a generatrix following a helix on a small cylinder concentric with the axis of the cutter and also following a helix on a much larger cylinder also concentric with the axis. The teeth of the cutter and the cutting faces may be inclined in either direction with respect to the axis and the degree of inclination may be varied as required.

Each tooth of the cutter is relieved along lines extending backward and inward from the outline of the non-radial cutting face. The relief lines form a continuous surface or continuous surfaces which extend from end to end of the cutter. The relief lines are properly constructed notwithstanding variations in radius at different points along the outline of the cutter and notwithstanding the variations in angular positions resulting from the non-radial helical cutting face. Preferably, the relief lines are maintained in similar relationship to each other as they extend backward and inward, the lines conforming to spirals of Archimedes.

When the relief lines conform to spirals and are maintained in similar relationship as they extend backward and inward, as is preferred, it is possible to sharpen or grind the teeth of the cutter on the front cutting faces without changing the effective contour. The teeth present the same effective contour at successive non-radial helicoidal surfaces of intersection similar in form and position to the initial cutting faces. At any surface back of the initial cutting face and similar to said face, the said effective contour will be found. Therefore, if the teeth are ground on their front faces to non-radial helicoids which are the same as the non-radial helicoids of the initial cutting faces, the effective contour will remain the same.

The machine disclosed in this application compensates the relieving movement at different blank diameters by varying the relation between the cutting tool and the former pin in accordance with the radius of the cutter blank.

Referring to the drawings, a mandrel 1 is provided for carrying a cutter blank 2. The blank 2 is provided with non-radially arranged or undercut cutting faces, and preferably the faces are helicoidal, as shown. Suitable means are provided for supporting and rotating the mandrel. A carriage 3, upon which is mounted a transversely movable slide 4, is movable longitudinally along ways 5—5. An independently-movable transverse slide 6, which carries a cutting tool 7, is carried by the slide 4. Preferably an intermediate slide 8 is provided by means of which preliminary adjustments may be effected. A former pin 9 is mounted on the slide 4 in a manner to be hereinafter set forth. The shape of said pin, in horizontal cross sectional outline, corresponds to that of the tool 7, preferably being exactly the same. A former 10 is secured to the main frame 11 of the machine. The former 10 is of special shape and has a contour 12 which is exactly the same as the desired effective contour of the finished cutter.

A spring member 14 is provided for pressing the slide 4 toward the rear. Thus the former pin 9 is always held in engagement with the former 10. It will be seen that, when the carriage 3 is moved longitudinally, the slide 4 will be caused to move transversely under the guidance of the former, the tool 7 thus being caused to follow an outline which is exactly the same as that of the former 10.

A suitable mechanism is provided for reciprocating the slide 6 to effect the relieving movements of the tool. The mechanism is mounted on the carriage 3 and on the transversely movable slide 4. A longitudinal shaft 15 is rotatably mounted in a bearing on a bracket 16 carried by the slide 4. The longitudinal shaft 15 carries a cam member 17. A lever 18 is pivoted to the slide 4. The lever 18 at its lower end engages the cam member 17 and at its upper end engages the slide 6. A spring member 19 serves to hold the slide 6 in engagement with the lever 18. It will be seen that, when the shaft 15 and the cam member 17 are rotated, the lever 18 will be oscillated, thus reciprocating the slide 6 and the tool 7. A longitudinal shaft 20, which is rotated in any suitable way, is provided for rotating the shaft 15 and the cam member 17. A worm member 21, which is movable longitudinally with the carriage 3 is splined on the shaft 20. A transverse horizontal shaft 22 is mounted on the carriage 3. The shaft 22 carries a worm wheel 23 which meshes with the worm member 21. A bevel gear wheel 24 is slidably mounted on the shaft 22 and is connected to such shaft by pins 35 projecting into grooves 36. The bevel gear 24 meshes with a bevel gear wheel 25 which is mounted on the shaft 15. The bevel gear 24 is engaged by the bracket 16 and is thus held in mesh with the bevel gear 25 as the slide 4 and the parts connected therewith move transversely. The shaft 20 is driven in proper timed relationship with the spindle so that normally for any given position of the carriage, the cam member 17 is given as many complete revolutions for each revolution of the blank as the blank has teeth.

In order that the relieving movements of the tool 7 may be varied in accordance with helicoidal cutting faces on the blank 2, we preferably provide means for supplementally rotating the blank in proportion to the longitudinal movement of the tool. As illustrated, the mandrel 1 is engaged by a chuck 26 on a spindle 27. Power for rotating the spindle is supplied through a sleeve member 28 which has splined engagement with a smaller sleeve member 29. A rod 30 and a forked lever 31 are provided for causing the sleeve member 29 to move longitudinally with the carriage 3. The spindle 27 is fixed against longitudinal movement and extends into the sleeve member 29. The sleeve member 29 is provided with a helical groove 32 having the same longitudinal pitch as the helicoidal cutting faces of the blank. A pin 33 on the spindle 27 projects into the groove 32, thus transmitting power from the sleeve 29 to the spindle. It will be seen that the construction permits the spindle 27 to be driven by means of the sleeve 28, but that the spindle is supplementally rotated in proportion to the longitudinal movement of the carriage and the cutting tool. This supplemental movement is just sufficient to enable the tool to properly engage the helicoidal teeth.

A screw 37 which engages a nut 38 on the carriage and slide, is provided for effecting feeding movements of the carriage and tool relatively to the blank 2. The screw 37 may be operated in any well known manner or may be operated in the manner disclosed in the application of Friederich Müller Serial No. 469,266, referred to above.

When operating on a cutter blank having undercut teeth some provision must be made for compensating the relieving operation at different blank diameters. If no such compensation is provided the blank will be cut to an incorrect contour. The necessity for compensating the relieving movements as the cutting tool moves inward or outward to conform to different blank diameters will be more apparent upon considering Figs. 12, 13 and 14.

Figure 12:
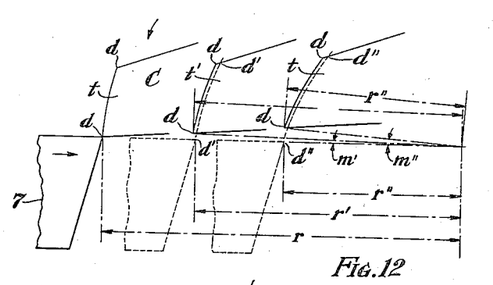
Figs. 12, 13 and 14 are diagrammatic views illustrating the operation of a cutting tool on a blank having undercut teeth.

Referring to Fig. 12, $t$ may be considered to be a fragmentary sectional view taken at the maximum radius $r$ of a cutter having undercut faces. Under the control of the former and the former pin, the cutting tool 7 is at a distance $r$ from the blank axis and is in position to engage the point of the tooth shown and to cut the proper relief line $d$—$d$ thereon. The tooth section at a smaller radius $r'$ is shown at $t'$. For this radius, without special provision being made, the tool 7 would be in the position indicated by dotted lines at the distance $r'$ from the blank axis. However, by reason of the inclined cutting face on the blank, the blank tooth would not be in engagement with the tool but would be separated therefrom by the angle $m'$. The tool, however, would immediately start its inward relieving movement notwithstanding the fact that the blank tooth had not yet reached it, and the result would be the cutting of an incorrect relief line $d'$—$d'$. For a still smaller radius $r''$ of the blank, as shown at $t''$, the result would be similar except that the point of the tooth would be separated from the tool by a greater angle $m''$, with the result that the incorrect relief line $d''$—$d''$ would be further from the correct relief line $d$—$d$.

Figure 13:
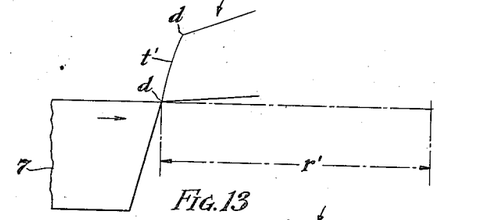
Figure 14:
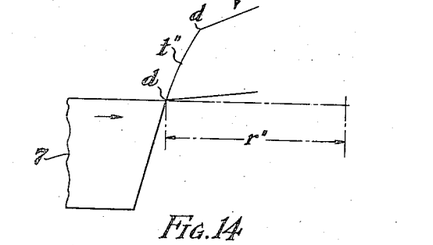

In order to avoid the errors which would occur, as shown in Fig. 12, we vary the relationship between the relieving movements of the tool and the rotative movement of the blank in such a way that the tool, as concerns its relieving movements, is always in the same position when engaged by the front edge of the tooth. This will be clear from an inspection of Figs. 13 and 14. Fig. 13 shows the tool at the same radius $r'$ from the blank axis as was shown in Fig. 12, but the relation of the relieving movement has been so changed that the blank is in position to be engaged by the point of the tool when the relieving movement starts. The tooth is therefore cut with the correct relief line $d$—$d$. Similarly, in Fig. 14, the tool is shown at the same distance $r''$ from the blank axis as was shown in Fig. 12, but the relation of the relieving movement has been so changed that the blank is in position to be engaged by the point of the tool when the effective relieving movement starts. The tooth is therefore cut with the correct relief line $d$—$d$. It will be seen that the operation, as illustrated in Figs. 12 to 14, is in no way effected by or dependent on the longitudinal inclination of the cutting faces. In other words, it is immaterial whether the cutting faces be helical or straight. The required variations in the relationship between the relieving movements of the tool and the rotative movement of the blank can be brought about by changing the position of the former pin 9 on the slide 4 in accordance with the diameter being cut on the blank.

Figure 1:
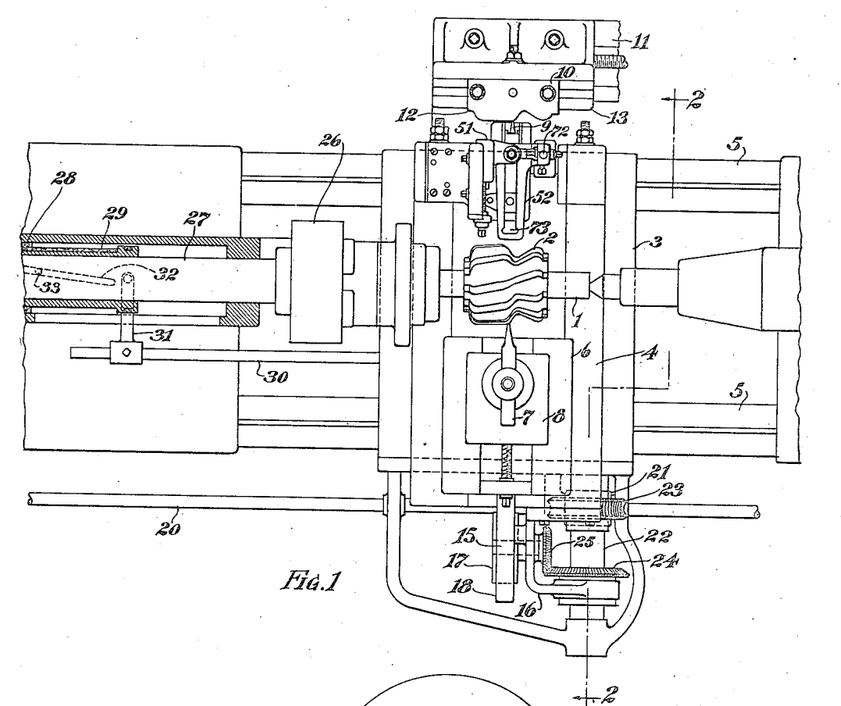
Figure 1 is a diagrammatic plan view of a machine embodying our invention.
Figure 2:
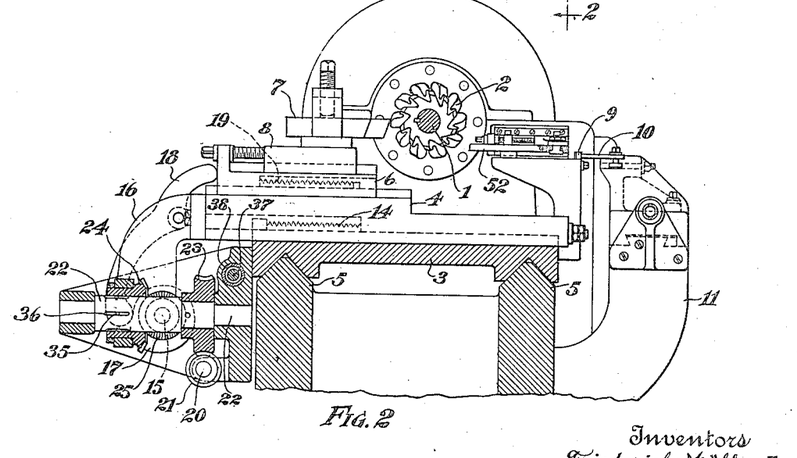
Fig. 2 is a sectional view of the machine taken along the line 2—2 of Fig. 1.

Referring to Figs. 1 and 2 and particularly to Figs. 3 to 11, inclusive, the manner of compensating the relieving operation at different blank diameters for the undercut teeth or non-radial cutting faces on the blank will be described. The former pin 9 is preferably dove-tailed to a sliding bar 40 and is firmly connected thereto by means of a bolt 41. The bar 40 is slidably mounted in an upstanding portion 42 from the slide 4. The bar 40 is provided with shoulder portions 43 which are engaged by plates 44. The plates 44 are attached to the extending portion 42 in any suitable manner, as by means of screws 45 and hold the bar 40 in position.

Figures 3, 4:
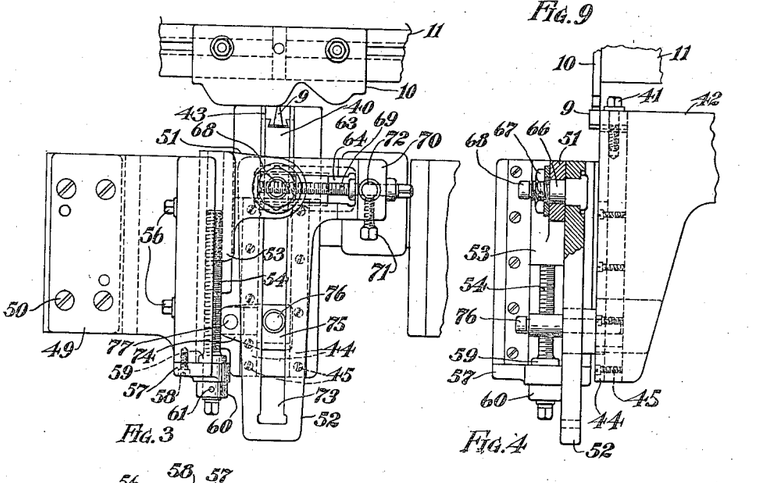
Fig. 3 is an enlarged plan view of the mechanism for compensating the relieving movements.
Fig. 4 is a side elevational view, partially in section, of the mechanism shown in Fig. 3.
Figure 5:
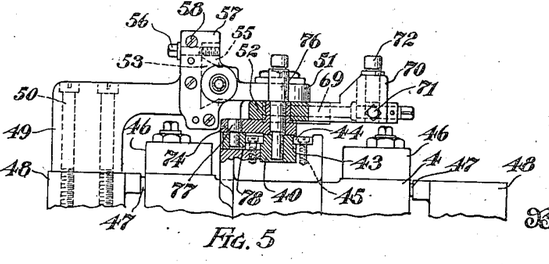
Fig. 5 is an end elevational view, partially in section, of the mechanism shown in Fig. 3.

Casings 46 each carrying a roller 47 are mounted on the extension 42 adjacent to the bar 9. The rollers 47 engage guideways on projecting portions 48 from the carriage 3. Reference may be had to the copending application of Friederich Müller Serial No. 522,304 filed December 14, 1921, for a complete description of the construction and operation of the rollers 47 and the parts enclosed by the casings 46.

A bracket 49 is mounted on one of the projecting portions 48 of the carriage 3 and is connected thereto by bolts 50. The bracket 49 carries a supporting arm 51 which in turn pivotally supports an L-shaped guide lever or member 52. The supporting arm 51 is provided with a block portion 53 which slides in a suitable guideway formed in the bracket 49. A screw 54, which is attached to the block portion 53, is provided for adjusting the position of the bar 40 and the former pin 9 in accordance with the maximum diameter of the blank for a purpose to be hereinafter set forth. A gib member 55, which is held in position by set screws 56, is provided for holding the arm 51 in any set position. The screw 54 is rotatably mounted in a plate 57 which is attached to the bracket 49 by means of screws 58. A collar 59, which is an integral part of the screw 54, is disposed on one side of the plate 57 and a removable collar 60 is attached to the screw 54 by a pin 61 on the opposite side of the plate 57.

The arm 51 is attached to the guide member 52 by means of an adjusting bar 62. The bar 62 is provided with an elongated portion 63 which fits within a slot 64 formed in the guide member 52. Shoulder portions 65 are provided which fit within grooves formed in the sides of the slot 64. A cylindrical portion 66 of the bar 62 is fitted to an opening in the arm 51 and a nut 67 is provided for holding the arm 51 and the guide member 52 together. A portion 68, having a center point marked thereon, extends through the nut 67 to serve as a reference point when setting the former pin 9 for different blanks provided with different undercut.

A screw 69, which is threadedly connected to the adjusting bar 62, serves to effect relative movement between the guide member 52 and the arm 51 which supports the guide member. The screw 69 is rotatably mounted in a lug 70 projecting from the guide member 52. A fixed collar on the screw is disposed on one side of the lug and a removable collar is mounted on the screw on the opposite side thereof in order to prevent longitudinal movement of the screw. A set screw 71 is provided for holding the screw 69 in any adjusted position. A pin 72, having a center point marked therein, is mounted in the lug 70 and together with the portion 68 of the bar 62 serves as reference points for adjusting the guide member 52.

A second slot 73, which is preferably disposed perpendicularly to the slot 64, is formed in the member 52. A correcting lever 74 is provided with an elongated portion 75 which is fitted to the slot 73. A pin 76, which is attached to the bar 40, extends through the portion 75 of the lever 74 and is provided with a center point marked therein to serve as a reference point when adjusting the screw 54. The lever 74 is connected by a pin 77 to a block 78 which slides in a slot formed in the slide 4.

In the mechanism disclosed in Figs. 3 to 11, inclusive, the center marks on the pin 76 and the adjusting bar 62 are adjusted, by the screw 54, a distance apart which is equal to the maximum radius of the blank. The pin 76 and the correction lever 74, which are mounted upon the slide 4 effect no translatory movement during such operation. The arm 51 which carries the guide lever 52 is moved relatively to the slide 4. The center marks on the pin 72 and on the adjusting bar 62 are moved a distance apart by the screw 69 in accordance with the undercut on the teeth of the blank and the angle of relief for the teeth. When adjusting the relative position of the pin 72 and the adjusting bar 62, it should be noted that the bar 62 is held against transverse movement by the arm 51 which is supported on the carriage 3. Consequently, the guide lever 52 is given a movement of rotation. Thus, the slot 73 is placed at an angle to the center line of the bar 40 and such angle is varied in accordance with the undercut and the angle of relief. Preferably the screw member 69 is adjusted prior to the adjusting of the screw 54.

The elongated portion 75 of the correction lever 74, which is fitted to the slot 73 in the guide lever 52, compels the correction lever 74 to move an angular distance in accordance with the angular movment of the guide lever. Consequently, when the slot 73 is angularly moved with reference to the center line of the bar 40, the correction lever 74 effects an angular movement, and, in so doing not only moves the block 78 in the slot formed in the slide 4 but also moves the bar 40 and the former pin 9 forward a small amount. It should be noted that, when the guide lever 52 is given a movement of rotation, the only point on the center line of the slot 73, which coincides with the center line of the bar 40, is the center of the pin 76. Consequently, when the slide 4 is moved forward to cut smaller diameters on the blank, the correction lever 74 is moved forward to increase the angular position of the slot 73 relative to the center line of the bar 40. The arm 51, which supports the guide lever 52, is, as before stated, mounted on the carriage 3 and consequently prevents the guide lever 52 from effecting any movement of translation during the forward movement of the slide 4. Thus, the forward movement of the correction lever 74 in the slot 73 compels the guide lever 52 to effect a movement of rotation about the part 66 of the adjusting bar 62. The correction lever 74 is compelled to effect an angular movement in accordance with the angular movement of the guide lever. Such angular movement of the correction lever 74 effects a small translatory movement of the bar 40 and the former pin 9 relative to the slide 4.

In the above manner, the distance between the tool and the former pin is varied to compensate at different blank diameters for the non-radial cutting faces on the teeth. The means for determining the distance apart to set the center marks on the pin 72 and the adjusting bar 62 will be disclosed more fully when reference is made to Figs. 10 and 11 of the drawings.

The adjusting mechanism disclosed in Figs. 3 to 9, inclusive, for varying the relation between the cutting tool and the former pin is set in accordance with the maximum diameter of the cutter blank, the amount of relief and the amount of undercut on the teeth of the blank. The screw 54 is adjusted to make the distance between the center marks on the pin 76 and the adjusting bar 62 equal to the maximum radius of the cutter blank. The distance between the center marks on the pin 72 and adjusting bar 62 is obtained mathematically by a formula to be explained in describing Figs. 10 and 11. The distance between the center marks on the pin 72 and adjusting bar 62, when the slot 73 is parallel to the bar 40, is varied a distance to compensate the relieving operation at different blank diameters in accordance with the undercut or the non-radial cutting faces on the teeth of the blank.

Figures 6, 7, 8, 9, 11:
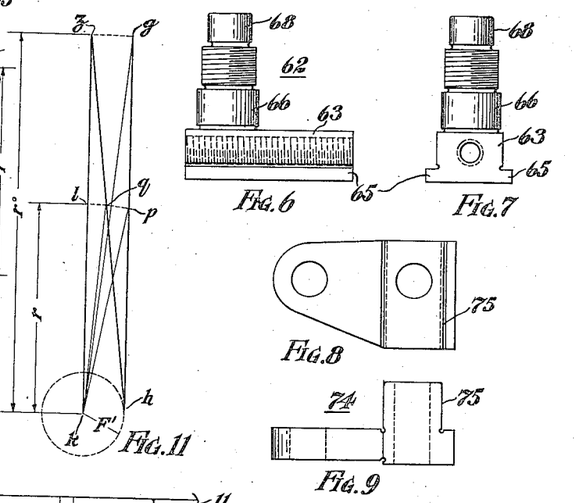
Figs. 6 and 7 are detail views of the adjusting bar.
Figs. 8 and 9 are detail views of the correcting lever.
Fig. 11 is a diagrammatic view showing a cutter in development.
Figure 10:
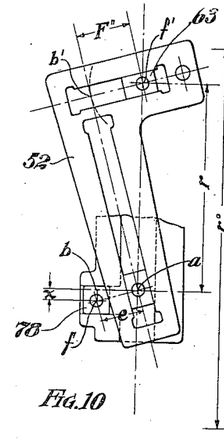
Fig. 10 is a diagrammatic view showing the relation of the levers illustrated in Figs. 3, 4 and 5.

Referring to Figs. 10 and 11, it is assumed:

$x$ = The change in distance between the former pin and the cutting tool.
$e$ = Length of the correction lever 74.
$F''$ = The correction factor for setting the compensating mechanism (Fig. 10).
$y$ = Required change in position of relieving movement.
$r$ = Radius of the cutter blank at any point.
$F$ = Total relief including all teeth.
$F'$ = The total undercut.
$r^\circ$ = The maximum radius of cutter blank.

Referring to Fig. 11, the distance $y$ that it is necessary to change the position of the relieving movement for non-radially arranged cutting faces is mathematically determined as follows: In Fig. 11, it is assumed $k$ is the center of the cutter blank, the line $zk$ is the cutting face of a tooth if the cutting faces were radially arranged, and the line $zh$ is the cutting face of a tooth if the cutting faces were non-radially arranged. The undercut is assumed to equal $F'$ and accordingly the line $zh$ is drawn tangent to the circle having a radius equal to $F'$. The line $gh$ is drawn parallel to, and at a distance $F'$, from the line $zk$.

At any point on the cutter having a radius $r$ which is less than the maximum radius $r^\circ$, the angles $pkq$ and $qkl$ are constructed with the lines $pk$ and $qk$ equal to the radius $r$. Comparing a cutter blank having radially arranged cutting faces with a cutter blank having undercut cutting faces, it is apparent that in the case of undercut teeth, the cutting tool would approach too near the center $k$ of the cutter blank before the cutting faces were reached by reason of the relieving movement. Thus, for a radius $r$, the cutting tool would approach the center $k$ of the cutter by a distance equal to the relief effected through the angle $lkq$. Inasmuch as the total relief is $F$, the relieving distance for which compensating must be effected is equal to $$\left(\frac{\text{angle } qkl}{360}\right) F = y.$$

In other words, the position of the relieving movement of the tool must be changed or retarded a distance $$\left(\frac{\text{angle } qkl}{360}\right) F$$

when cutting a point on the cutter blank having a radius $r$.

Referring to Fig. 11:

The angle $qkl$ = angle $pkl$ − angle $pkq$.
The angle $pkq$ = angle $gkz$.

It is apparent that the angle $pkq$ equals the angle $gkz$ when the straight line $zq$ is assumed to be turned through an angle *pkq* about the center *k*. Upon being turned through such an angle the line *zq* takes a position coinciding with the line *gp*. In like manner the line *zq* assumes a position coinciding with the line *gp* when rotated through an angle *gkz* about the center *k*. Therefore, angle *qkl* = angle *pkl* — angle *gkz* and $$y = \frac{(\text{angle } pkl - \text{angle } pkq)}{360}F = \frac{(\text{angle } pkl - \text{angle } gkz)}{360}F$$

Sine of angle $pkl = \frac{F'}{pk} = \frac{F'}{r}$

Sine of angle $gkz = \frac{F'}{gk} = \frac{F'}{r^o}$

Inasmuch as the value of *y*, the relieving distance for which compensation must be effected, is given in terms of the angles, values must be obtained for angles *pkl* and *gkz*.

The angle *pkl* is equal to the arc which corresponds to the known sine of such angle. Angle $pkl = \arcsin \frac{F'}{r}$. The angle *gkz* is equal to the arc which corresponds to the sine $\frac{F'}{r^o}$ = angle $gkz = \arcsin \frac{F'}{r^o}$.

Therefore $$y = \frac{(\text{angle } pkl - \text{angle } gkz)F}{360}$$

$$\frac{F}{2\pi}\left(\arcsin \frac{F'}{r} - \arcsin \frac{F'}{r^o}\right).$$

The above value of *y* is the amount the tool must be retarded at any radius *r* of the cutter blank, when compared with the position of the tool at a radius $r^o$. The retarding amount when compared with a position beyond $r^o$ is larger, and the retarding amount is largest when the position compared with is considered to extend to infinity. If we consider $r^o$ to equal infinity, then $$\arcsin \frac{F'}{r^o} = \frac{F'}{\text{infinity}} = 0.$$

Therefore, if we consider $r^o$ to equal infinity the retarding amount *y* equals $$\frac{F}{2\pi}\left(\arcsin \frac{F'}{r}\right).$$

In the case of very small angles, such as are being considered, the arcsin may be taken equal to the sine. The solving of the above equation by substituting the sine for the arcsin does not produce an exact mathematical result but an approximation is obtained which is very much closer to the correct result than can be worked to by modern tools. Accordingly we may use an approximation formula $$y = \left(\frac{FF'}{2\pi}\right)\frac{1}{r}.$$

for determining the required correction.

It is apparent from the above discussion that the tool must be retarded or compensated an amount which is inversely proportional to the varying radius *r* of the cutter blank. In other words the relieving movement must be retarded an amount which varies inversely with the radius of the cutter blank. Referring to Fig. 10 it is shown that the compensating mechanism disclosed in Figs. 3 to 9, inclusive, satisfies the above requirement and changes the position of the relieving movement inversely in accordance with the radius of the cutter blank.

The levers, which are shown in Figs. 3 to 9, inclusive, are diagrammatically illustrated in Fig. 10 in order to more clearly set forth their operative relation to each other. The line *af'* in Fig. 10 is equal to the radius *r* of the cutter blank at any point and is the distance between the center marks on the pin 76 and adjusting bar 62. The line *af* is equal in length to *e* and is placed in the position assumed by the correction lever 74 for any desired compensation of the relieving operation. The lines *ab* and *fb* are respectively drawn perpendicularly and parallelly to the line *af'*. The line *fb* equals the distance *x*, which represents the variation in distance between the cutting tool and the former pin that must be made for certain values of the relief, the undercut and the diameter of the cutter blank. The line *b'f'* is drawn perpendicularly to the line *ab'* and has a length F'' which is to be determined. The line *ab'* is drawn in the angular position necessary to place the slot 73 when a correction *x* is made in the distance between the cutting tool and the former pin. Inasmuch as the triangles *abf* and *af''b'* are right-angle triangles, it is apparent $$\frac{x}{e} = \frac{F''}{r} \text{ and } x = \frac{eF''}{r}.$$

The value of *x* thus obtained varies inversely in accordance with the radius *r* of the cutter blank. By taking *x* equal to *y*, a value for the correcting constant F'' can be obtained for setting the compensating mechanism.

$$y = \left(\frac{FF'}{2\pi}\right)\frac{1}{r} \text{ and } x = \frac{eF''}{r}$$

Therefore, $$\left(\frac{FF'}{2\pi}\right)\frac{1}{r} = \frac{eF''}{r}$$

and $$F'' = \frac{FF'}{e2\pi}$$

The above formula although not absolutely mathematically correct will determine the correction factor $F''$ much closer than can be worked to on modern machines.

By means of the equation $$F'' = \frac{FF'}{e2\pi}$$

the correction factor $F''$ may be determined inasmuch as $e$ is a constant and the relief $F$ and the undercut $F'$ are known. Upon determining the value of $F''$ for a given cutter blank, the screw 69 is operated to adjust the distance between the center punch marks on the pin 72 and the adjusting bar 62 in accordance therewith. The normal distance between the two center-punch marks is diminshed in accordance with the value of $F''$. After setting the screw 69 the screw 54 is adjusted in accordance with the maximum radius of the cutter. The screw 54 is so adjusted that the distance between the center-punch marks on the pin 76 and on the adjusting bar 62 is equal to the maximum radius of the cutter blank. The cutting tool is finally set to cut the maximum radius on the cutter blank. Upon movement of the tool to cut a different radius, the position of the relieving movement is varied inversely with the value of $r$.

When the compensating mechanism is set for the maximum radius of the cutter a value of $x$ is indicated on the compensating mechanism inasmuch as the correction is referred to an infinite radius as above set forth. The value of $x$ thus indicated is $$\left(\frac{FF'}{2\pi}\right)\frac{1}{r^0}$$

and is taken care of by adjusting the tool in engagement with the blank. The correction at any radius $r$ when compared with an infinite radius is $$\left(\frac{FF'}{2\pi}\right)\frac{1}{r}.$$

The difference in the correction between points at radius $r^0$ and radius $r$ or the correction at $r$ when compared with the radius $r^0$ is $$\frac{F}{2\pi}\left(\frac{F}{r} - \frac{F'}{r^0}\right).$$

It will be seen that two independent variations are effected in the relation between the relieving movements of the tool and the rotative movement of the blank. One of these variations is dependent upon the longitudinal movements of the tool along the blank and the other of the variations is dependent upon the inward or outward movement of the tool whereby the blank is cut with different diameters. In the preferred embodiment of the invention, as shown and described, the first said variation is effected by changing the rotative movement of the blank and the second variation is effected by changing the relieving movements of the tool.

Modifications in the mechanism and in the arrangement and location of parts may be made within the spirit and scope of our invention and such modifications are intended to be covered by the appended claims.

What we claim is:

1. In a relieving machine for operating on a cutter blank having teeth provided with non-radially arranged cutting faces, the combination comprising a cutting tool, a pin and a former member for guiding the cutting tool, means for effecting relieving movements of the tool relative to the blank, and means for varying the distance between the tool and said pin in accordance with the diameter cut on the blank to compensate for the non-radial cutting faces on the teeth.

2. In a relieving machine for operating on a cutter blank having helical teeth provided with non-radially arranged cutting faces, the combination comprising a cutting tool, means comprising a pin and a former for guiding the cutting tool to cut a predetermined non-rectilinear contour, means for varying the movements of the cutting tool to relieve the teeth on the blank, and means for varying the distance between the tool and said pin to compensate the relieving operation at different blank diameters for the non-radial cutting faces on the teeth.

3. In a relieving machine for operating on a cutter blank having teeth provided with non-radially arranged cutting faces, the combination comprising a cutting tool, means for effecting feeding movements between the tool and the blank, means comprising a pin and a former for guiding the cutting tool to cut a predetermined contour, means for varying the movements of the cutting tool to relieve the teeth on the blank, and means for varying the distance between the tool and said pin to compensate the relieving operation at different blank diameters for the non-radial cutting faces on the teeth.

4. In a relieving machine, the combination comprising a rotatable spindle adapted to carry a blank having teeth provided with non-radially arranged cutting faces, a cutting tool, means for effecting relative feeding movement between the tool and the blank longitudinally of the latter, means comprising a pin and former for moving the tool inward or outward during the feeding movement to cut the blank with different diameters, means for effecting relieving movements of the tool in timed relation to the blank rotation, and means for varying the relation between the tool and said pin in accordance with the different diameters cut on the blank to compensate the relieving operation for the non-radial tooth faces on the blank.

5. In a relieving machine, the combination comprising a rotatable spindle adapted to carry a blank having teeth provided with non-radially arranged cutting faces, a cutting tool, means for effecting relative feeding movements between the tool and the blank longitudinally of the latter, means comprising a pin and former for moving the tool inward or outward during the feeding movement to cut the blank with different diameters, means for effecting relieving movements of the tool in timed relation to the blank rotation, means for varying the relation between the relieving movements of the tool and the rotative movement of the blank in conformity with helical teeth on the blank, and means for varying the relation between the tool and said pin to compensate the relieving operation at different blank diameters for the non-radial tooth faces on the blank.

6. In a relieving machine for operating on a cutter blank having helical teeth provided with non-radially arranged cutting faces, the combination comprising a cutting tool, means for effecting longitudinal feeding movements between said tool and the blank, means comprising a pin and a former for guiding the tool to cut a predetermined non-rectilinear contour, means for varying the movements of the cutting tool to relieve the teeth on the blank, and means for varying the distance between the tool and said pin to compensate the relieving operation for the non-radial cutting faces on the teeth in accordance with the variations in diameter of the blank.

7. In a relieving machine for operating on a cutter blank having helical teeth provided with non-radially arranged cutting faces, the combination comprising a cutting tool, means for effecting longitudinal feeding movements between said tool and the blank, means comprising a pin and a former for guiding the tool to cut a predetermined contour, means for varying the movements of the cutting tool to relieve the teeth on the blank, and means for varying the distance between the tool and said pin to compensate the relieving operation for the non-radial cutting faces on the teeth in accordance with the variations in diameter of the blank.

8. In a relieving machine for operating on a cutter blank having teeth provided with non-radially arranged cutting faces, the combination comprising a cutting tool, means for effecting longitudinal feeding movement between the tool and the blank, means comprising a pin and a former for guiding the cutting tool to cut a predetermined contour, means for effecting relieving movements, and means for varying the relation between the tool and said pin to compensate the relieving operation at different blank diameters for the non-radial cutting faces on the teeth.

9. In a relieving machine for operating on a cutter blank, the combination with a cutting tool, and means comprising a former and a former pin for guiding said tool to cut the blank to any predetermined contour, of means for automatically moving said pin relatively to the tool in accordance with the variations in diameter being cut on the blank.

10. In a relieving machine for operating on a cutter blank having helical teeth, the combination with a cutting tool, means comprising a former and a former pin for guiding said tool to cut the blank to any predetermined non-rectilinear contour, and a slide for carrying said tool and the pin, of means for varying the position of said pin on the slide in accordance with the diameter being cut on the blank.

11. In a relieving machine for operating on a cutter blank, the combination with a carriage, a slide adapted to effect transverse movement on the carriage, and a cutting tool and a former pin mounted on said slide, of means for automatically moving said pin on the slide relatively to the cutting tool in accordance with the variations in diameter being cut on the blank.

12. In a relieving machine for operating on a cutter blank having undercut teeth, the combination with a carriage, a slide adapted to effect transverse movement on the carriage, and a cutting tool and a former pin mounted on the slide, of adjustable mechanism for connecting said pin to the carriage and to the slide, said mechanism being adjusted in accordance with the undercut on the teeth of the blank to vary the position of the pin on the slide in accordance with the diameter being cut on the blank.

13. In a relieving machine for operating on a cutter blank having undercut helical teeth, the combination with a carriage, a slide adapted to effect transverse movement on the carriage, and a cutting tool and a former pin mounted on said slide, of adjustable mechanism for connecting said pin to the carriage and the slide, said mechanism being adjusted in accordance with the undercut on the teeth and the desired relief to vary the position of the pin on the slide in accordance with the diameter being cut on the blank.

14. In a relieving machine, the combination with a carriage, a slide adapted to effect transverse movement on the carriage, and a cutting tool and a former pin mounted on said slide, of connecting means between said slide and the carriage for varying the relation of said pin to the tool in accordance with the movement of the slide relatively to the carriage.

15. In a relieving machine, the combination with a carriage, a slide adapted to move transversely on the carriage, and a cutting tool and a former pin mounted on said slide, of pivotal connecting means between said slide and the carriage for varying the position of the pin relative to the cutting tool in accordance with the movement of the slide.

16. In a relieving machine, the combination with a carriage, a slide adapted to move transversely on the carriage, and a cutting tool and a former pin mounted on said slide, of means comprising a guide member pivotally mounted on the carriage and a correction lever connected to said pin and to the guide member for varying the relation of the pin to the tool in accordance with the movement of the slide.

17. In a relieving machine, the combination with a carriage, a slide adapted to move transversely on the carriage, and a cutting tool and a former pin mounted on said slide, of a guide member pivotally mounted on said carriage, a correction lever mounted on said slide and connected to the guide member and to said pin, and means for adjusting the relative position of the guide member and the correction lever to automatically vary the position of said pin on the slide in accordance with the diameter being cut on the blank.

18. In a relieving machine, the combination with a carriage, a slide mounted on the carriage, a cutting tool mounted on said slide, and a former pin slidably mounted on the slide, of a guide member pivotally mounted on said carriage, means for adjusting the position of the guide member on the carriage, and a correction lever mounted on the slide and connected to the guide member and to the former pin, said guide member serving to operate the correction lever for any movement of the slide relative to the carriage to vary the relation between the cutting tool and the former pin.

19. In a relieving machine, the combination with a carriage, a slide mounted on the carriage, a cutting tool mounted on said slide, and a former pin slidably mounted on the slide, of a guide member pivotally mounted on said carriage, means for adjusting the position of the guide member on the carriage, a correction lever mounted on the slide and connected to the guide member and to the former pin, and means for rotatably adjusting the guide member, said guide member serving to operate the correction lever for any movement of the slide relative to the carriage to vary the relation between the cutting tool and the former pin.

20. In a relieving machine for operating on a cutter blank having undercut teeth, the combination with a carriage, a slide mounted on the carriage, a cutting tool mounted on said slide, and a former pin slidably mounted on the slide, of an arm slidably mounted on the carriage, a guide member pivotally mounted on said arm, a correction lever mounted on the slide and connected to the guide member and to the former pin, and means for adjusting the position of said arm and the guide member relative to the carriage and for adjusting the position of the guide member relative to said arm to automatically vary the position of said pin on the slide in accordance with the diameter being cut on the blank.

21. In a relieving machine for operating on a cutter blank having undercut teeth, the combination with a carriage, a cutting tool mounted on said slide, and a former pin slidably mounted on said slide, of an arm slidably mounted on the carriage, a guide member pivotally mounted on said arm, a correction lever mounted on the slide and connected to the guide member and to the former pin, and means for adjusting the position of the arm relative to the position of the correcting lever in accordance with the maximum diameter of the blank being cut and for adjusting the position of the guide member relative to said arm in accordance with the undercut on the teeth of the blank to automatically vary the position of said pin on the slide in accordance with the diameter being cut on the blank.

22. In a relieving machine for operating on a blank, the combination comprising a carriage, a slide movable transversely on the said carriage, a cutting tool mounted on said slide, a former pin slidably mounted on the slide, a guide member mounted on the carriage and a correction lever slidably and pivotally mounted on said slide and pivotally connected to said former pin, said correction lever operating in a slot formed in the guide member and serving to vary the relation of the cutting tool to the former pin upon movement of the slide to cut the blank to different diameters.

In testimony whereof, we hereto affix our signatures.

FRIEDERICH MÜLLER.
ERNEST WILDHABER.